US012790006B2

(12) United States Patent
Guennewig

(10) Patent No.: US 12,790,006 B2
(45) Date of Patent: Nov. 10, 2026

(54) AIRCRAFT EMERGENCY OXYGEN SUPPLY SYSTEM, AND AIRCRAFT COMPRISING SUCH AN EMERGENCY OXYGEN SUPPLY SYSTEM

(71) Applicant: B/E Aerospace Systems GmbH, Lübeck (DE)

(72) Inventor: Frank Guennewig, Luebeck (DE)

(73) Assignee: B/E AEROSPACE SYSTEMS GMBH, Luebeck (DE)

( * ) Notice: Subject to any disclaimer, the term of this patent is extended or adjusted under 35 U.S.C. 154(b) by 818 days.

(21) Appl. No.: 18/192,753

(22) Filed: Mar. 30, 2023

(65) Prior Publication Data

US 2023/0312113 A1 Oct. 5, 2023

(30) Foreign Application Priority Data

Mar. 31, 2022 (EP) .................................... 22166224

(51) Int. Cl.

*B64D 25/00* (2006.01)
*A62B 7/14* (2006.01)
*A62B 25/00* (2006.01)
*B64D 11/00* (2006.01)

(52) U.S. Cl.

CPC ................ *B64D 25/00* (2013.01); *A62B 7/14* (2013.01); *A62B 25/005* (2013.01); *B64D 11/00* (2013.01); *B64D 2231/025* (2013.01)

(58) Field of Classification Search

CPC .......... B64D 2231/025; B64D 2231/02; A62B 25/00

See application file for complete search history.

(56) References Cited

U.S. PATENT DOCUMENTS

| | | | | |
|---|---|---|---|---|
| 4,154,237 A * | 5/1979 | Courter | B64D 11/00 | 244/118.6 |
| 4,481,945 A * | 11/1984 | Levine | B64D 11/0632 | 128/202.13 |
| 4,909,247 A | 3/1990 | Terrisse et al. | | |
| 5,078,343 A | 1/1992 | Howlett | | |
| 5,309,604 A * | 5/1994 | Poulsen | F16L 3/223 | 24/339 |
| 9,302,074 B2 * | 4/2016 | Atkinson | A61M 25/02 | |
| 2013/0074836 A1 * | 3/2013 | Contino | A62B 7/08 | 128/205.25 |
| 2019/0152610 A1 * | 5/2019 | Rittner | A62B 18/08 | |
| 2020/0317348 A1 * | 10/2020 | Krause | A62B 25/005 | |

OTHER PUBLICATIONS

European Search Report for Application No. 22166224.0, mailed Sep. 13, 2022, 8 pages.

* cited by examiner

*Primary Examiner* — Timothy A Stanis
*Assistant Examiner* — Alec R Wahl
(74) *Attorney, Agent, or Firm* — CANTOR COLBURN LLP

(57) ABSTRACT

An aircraft emergency oxygen supply system includes a least one passenger oxygen mask, a compartment for housing the at least one passenger oxygen mask and at least one oxygen hose. Each oxygen mask is coupled to a respective oxygen hose. The system also includes at least one fixing clip. The clips(s) include a lanyard fixing portion and at least one C-shaped oxygen hose fixing portion for releasably holding one or more oxygen hoses. Lanyards are provided to fix the hose to the compartment.

17 Claims, 4 Drawing Sheets

AIRCRAFT EMERGENCY OXYGEN SUPPLY SYSTEM, AND AIRCRAFT COMPRISING SUCH AN EMERGENCY OXYGEN SUPPLY SYSTEM

CROSS-REFERENCE TO RELATED APPLICATIONS

This application claims priority to European Patent Application No. 22166224.0 filed Mar. 31, 2022, the entire contents of which is incorporated herein by reference.

TECHNICAL FIELD

The present invention is in the field of aircraft equipment. The present invention is in particular in the field of emergency equipment for aircraft. Further in particular, the present invention is in the field of aircraft emergency oxygen supply systems in passenger aircraft and aircraft comprising such emergency oxygen supply systems.

BACKGROUND

Modern aircraft comprising a pressurized cabin are equipped with emergency oxygen masks, which are deployed for the passengers in case of a loss of cabin pressure during flight. The oxygen masks are part of self-sustained aircraft emergency oxygen supply systems, including oxygen sources that provide oxygen gas to oxygen masks for the passengers, in case cabin pressure is lost.

In case of pressure loss within a passenger cabin of an aircraft, the oxygen masks drop from the ceiling above the passenger seats. The oxygen masks are tied to lanyards, which extend between the oxygen masks and the ceiling for holding the oxygen masks at positions, which are in sight of the passengers and which can be reached easily by the passengers for grabbing the oxygen mask.

The lanyards holding the oxygen masks, however, may entangle. Entangled lanyards may make it difficult for the passengers reach the oxygen masks and/or to put the oxygen masks properly onto their faces, in particular in stressful emergency situations.

It would therefore be beneficial to provide an aircraft emergency oxygen supply system, which allows for positioning the oxygen masks in desired positions next to the passengers, after the aircraft emergency oxygen supply system has been activated, but which also has a low risk of obstructing the use of the oxygen masks, in particular the risk of obstructing a free movement of the oxygen masks, which may be caused by an entanglement of lanyards tied to the oxygen masks.

SUMMARY

Exemplary embodiments of the invention include an aircraft emergency oxygen supply system that comprises at least one passenger oxygen mask; a compartment for housing the at least one passenger oxygen mask; at least one oxygen hose and at least one fixing clip. Each of the at least one passenger oxygen mask is coupled to a respective oxygen hose for supplying a gas comprising oxygen to the respective oxygen mask. Each of the at least one fixing clip comprises a lanyard fixing portion, and at least one C-shaped oxygen hose fixing portion for releasably holding one or more oxygen hoses, in order to fix a portion of the at least one oxygen hose to the fixing clip. For each of the at least one fixing clip, the aircraft emergency oxygen supply system further comprises a lanyard having a first end, which is fixed at the compartment, and an opposing second end, which is fixed to the lanyard fixing portion of the respective fixing clip.

The fixing clip couples a lanyard to one or more oxygen hoses, which is/are arranged within the oxygen hose fixing portion. After the aircraft emergency oxygen supply system has been activated and the oxygen masks have dropped out of the compartment of the aircraft emergency oxygen supply system, the lanyard holds the one or more oxygen hoses in a predefined position next to the passengers. In particular, a suitable length of the lanyard and a suitable position of the fixing clip along the oxygen hose(s) may allow for presenting the oxygen mask(s) at a desired vertical position with respect to the passengers. The fixing clip may allow for releasing the one or more oxygen hoses from the lanyard by pulling the oxygen mask(s), which is/are coupled to the one or more oxygen hoses, towards one or more passengers, thus pulling the one or more oxygen hoses out of the fixing clip. Releasing the one or more oxygen hoses from the lanyard may allow for a free movement of the one or more oxygen masks, wherein the movement of the oxygen mask(s) is in particular not restricted by an entanglement of the lanyard with other lanyards or oxygen hoses.

In an embodiment, the at least one C-shaped oxygen hose fixing portion is elastic. This may allow the one or more oxygen hoses to escape from the at least one C-shaped oxygen hose fixing portion in a particularly convenient manner, when the one or more oxygen hoses is/are pulled. The one or more oxygen hoses may in particular escape from the at least one C-shaped oxygen hose fixing portion when being pulled by a passenger, who grabs one of the oxygen masks attached to the one or more oxygen hoses and puts said oxygen mask onto his/her face. In other words, the one or more oxygen hoses may be released from the fixing clip by applying a pulling force, which corresponds to the force, which is typically applied by a passenger grabbing an oxygen mask and pulling said oxygen mask to his face. The one or more oxygen hoses may also be elastic, with the elasticity of the C-shaped oxygen hose fixing portion and the elasticity of the one or more oxygen hoses cooperating in the release of the oxygen hose(s) from the fixing clip. It is also possible that the C-shaped oxygen hose fixing portion is only little elastic or substantially rigid. In this case, the elasticity of the one or more oxygen hoses may allow for the release of the oxygen hose(s) from the fixing clip.

In an embodiment, the at least one oxygen hose fixing portion comprises an opening for accommodating the portion of the at least one oxygen hose. The at least one oxygen hose fixing portion may in particular comprise two legs defining a C-shaped outer periphery of the opening.

In an embodiment, each of the two legs comprises a free end, and the free ends of the two legs are arranged opposite to each other in a distance from each other, forming a gap between the free ends of the two legs. If only one oxygen hose is arranged within the opening, the width of the gap is smaller than the diameter of the oxygen hose. If a plurality of oxygen hoses are arranged within the opening, the width of the gap is set smaller than the sum of the diameters of the oxygen hoses, which are arranged within the opening.

In an embodiment, at least one of the legs and/or the one or more oxygen hose(s) is/are elastic, so that the oxygen hose(s) is/are allowed to pass through the gap by deforming at least one of the legs and/or the oxygen hose(s). In consequence, the one or more oxygen hose(s) may be released from the lanyard by pulling an oxygen mask, which is coupled to an oxygen hose. While above described release mechanism provides for a particularly flexible handling of the oxygen mask(s), it is also possible that the oxygen mask(s) are used by the passenger(s) with the oxygen hoses(s) still held by the fixing clip.

In an embodiment, for at least a subset of the at least one fixing clip, the fixing clip comprises a single C-shaped oxygen hose fixing portion for releasably holding two oxygen hoses side-by-side within the single C-shaped oxygen hose fixing portion. This may result in a simple structure of the fixing clip, as only a single oxygen hose fixing portion needs to be formed for holding multiple oxygen hoses. It is also possible that the single C-shaped oxygen hose fixing portion is shaped for releasably holding more than two oxygen hoses, such as three or four or more oxygen hoses.

The term at least a subset of the at least one fixing clip means that at least one, a plurality, or all fixing clips of the aircraft emergency oxygen supply system may be provided with a single C-shaped oxygen hose fixing portion for releasably holding two oxygen hoses, as it has been described before.

In an embodiment, the lanyard fixing portion of the fixing clip is arranged at a center portion of the fixing clip, in particular at a center portion of the one C-shaped oxygen hose fixing portion. This may result in a symmetric configuration of the fixing clip. The fixing clip may be well-suited for contributing to the presentation of two oxygen masks side-by-side, because the lanyard may position the center of the fixing clip at a desired position.

In an embodiment, for at least a subset of the at least one fixing clip, the fixing clip comprises two C-shaped oxygen hose fixing portions for releasably holding one oxygen hose each. In other words, in such an embodiment, each oxygen hose is held separately in an individual oxygen hose fixing portion, respectively. As a result, each oxygen hose may be released individually from the fixing clip without simultaneously releasing the other oxygen hose(s) as well.

In an embodiment, which comprises two C-shaped oxygen hose fixing portions, the lanyard fixing portion of the fixing clip may be arranged between the two C-shaped oxygen hose fixing portions. This may result in a symmetric configuration of the fixing clip. The fixing clip may be well-suited for contributing to the presentation of two oxygen masks side-by-side, because the lanyard may position the center of the fixing clip at a desired position.

In an embodiment, the two C-shaped oxygen hose fixing portions are arranged adjacent to each other and have a common orientation. This means that the gaps of the C-shaped oxygen hose fixing portions are oriented parallel to each other in the same direction. In consequence, the oxygen hoses may be released from the oxygen hose fixing portions by pulling the oxygen hoses parallel to each other in the same direction.

In an embodiment, the two C-shaped oxygen hose fixing portions are arranged adjacent to each other and are oriented angled with respect to each other. In other words, the gaps of the C-shaped oxygen hose fixing portions are not oriented in the same direction, but in two different directions, which are inclined with respect to each other, so that the angle between the two different directions is between 0° and 180°.

When projected onto the plane, in which the fixing clip mainly extends, the angle between the two C-shaped oxygen hose fixing portions may in particular be between 40° and 180°, further in particular between 80° and 160°, yet further in particular between 120° and 150°.

A fixing clip, in which the oxygen hose fixing portions are angled with respect to each other, may allow for releasing the oxygen hoses from the fixing clip by pulling the oxygen hoses in two different direction, which are not oriented parallel to each other. This may make the releasing of the oxygen hoses from the fixing clip easier, as the two oxygen hoses may be pulled in opposite directions, or directions which are close to opposite directions, for releasing the oxygen hoses from the fixing clip. This may in particular contribute to a convenient use of the passenger masks in cases where the fixing clip is positioned between two passengers, when the passenger masks drop out of the compartment.

In an embodiment, for at least a subset of the at least one oxygen hose, the respective oxygen hose comprises a shroud for positioning the fixing clip along the oxygen hose. The shroud may have a larger diameter than other portions of the oxygen hose. The shroud may in particular have a slot for accommodating the fixing clip. More particularly, the shroud may include two shroud portions, and the slot may be formed in between said two shroud portions. The shroud and/or the shroud portions may be formed integrally with the oxygen hose or they may be attached, in particular glued, to the oxygen hose.

When the fixing clip is inserted into a slot formed within the shroud, the fixing clip is prevented from moving along the longitudinal direction of the oxygen hose. The position of the fixing clip along the longitudinal direction may be well defined and fixed in a reliable and convenient manner. A well defined and fixed position of the fixing clip along the longitudinal direction of the one or more oxygen hoses may be beneficial for positioning the one or more oxygen masks, which is/are coupled to the oxygen hose(s), in a desired position in front of the passengers.

In an embodiment, the at least one fixing clip is made of a plastics material, in particular polyamide, such as polyamide 66. A plastics material, for example a polyamide, such as polyamide 66, has been found as well suited for forming the fixing clip.

In an embodiment, the lanyard fixing portion comprises an lanyard fixing opening, to which the second end of the lanyard is fixed. The second end of the lanyard may, in particular, be tied to the lanyard fixing opening. Tying an end of the lanyard to a lanyard fixing opening, which is formed in the fixing clip, may provide for an easy, inexpensive and reliable way of fixing the lanyard to the fixing clip.

In an embodiment, the aircraft emergency oxygen supply system comprises at least two oxygen masks, at least two oxygen hoses, at least one lanyard and at least one fixing clip for releasably coupling the at least one lanyard with at least one of the oxygen hoses. In such an embodiment, one oxygen hose is fluidly coupled with one oxygen mask, respectively.

The aircraft emergency oxygen supply system may comprise at least one fixing clip, which may be releasably attached to two oxygen hoses, or the aircraft emergency oxygen supply system may comprise at least two fixing clips, wherein each of the two fixing clips may be releasably attached to only one oxygen hose, respectively.

In an embodiment, the aircraft emergency oxygen supply system comprises a plurality of lanyards and a plurality of fixing clips. The aircraft emergency oxygen supply system may in particular comprise the same number of lanyards and fixing clips, and each oxygen hose may be releasably held by one of the fixing clips, respectively.

In an embodiment, the aircraft emergency oxygen supply system comprises at least two fixing clips and at least two lanyards, wherein the first ends of the at least two lanyards are in particular fixed to spatially separated fixing portions of the compartment. With such an arrangement, the oxygen masks may be presented to the passengers at desired horizontal distances in a particularly effective and reliable manner. Stated differently, attaching the first ends of the lanyards to different, spaced portions of the compartment may allow for the fixing clips to have laterally offset positions, when the oxygen masks drop out of the compartment, such that an easy-to-use horizontal distribution of the oxygen masks may be achieved.

In an embodiment, the aircraft emergency oxygen supply system comprises an oxygen supply, coupled to the at least one oxygen hose, wherein the oxygen supply is electrically triggered and/or electrically controlled during the supply of oxygen to the at least one passenger oxygen mask. The oxygen supply may in particular be triggered and/or controlled in response to a breath detection, when the passenger oxygen mask(s) is/are in use. In such an arrangement, the lanyard may be freed from the task of mechanically triggering the oxygen supply, as was the lanyard's task in many previous approaches. The lanyard may thus be specifically adapted to ensure a good relative positioning between the compartment and the fixing clip, when the oxygen masks drop out of the compartment. The compartment and the fixing clip may remain fixed to each other via the lanyard throughout the use of the aircraft emergency oxygen supply system, with the flexibility in positioning the oxygen mask (s) stemming from the possibility of moving the lanyard with respect to the compartment, which is limited due to the fixed length of the lanyard, and from the release of the oxygen hose(s) from the fixing clip, which makes the movement of the oxygen hose(s) independent from the fixing clip and, thus, from the lanyard.

Exemplary embodiments of the invention also include an aircraft, which comprises a passenger cabin and a plurality of aircraft emergency oxygen supply systems according to exemplary embodiments of the invention. The additional features, modifications and effects, as described above with respect to the aircraft emergency oxygen supply system, apply to the aircraft in an analogous manner.

In an embodiment, the passenger cabin has multiple rows of passenger seats, and at least one aircraft emergency oxygen supply system may be provided for each row of passenger seats.

Each row of passenger seats may comprise a plurality of groups of adjacent passenger seats. The groups of adjacent passenger seats may be separated by one or more aisles, extending between the groups of passengers seats.

An aircraft emergency oxygen supply system according to an embodiment of the invention may be associated with each group of adjacent passenger seats, respectively.

The aircraft may also be equipped with one or more aircraft emergency oxygen supply systems that are associated with one passenger seat only.

BRIEF DESCRIPTION OF THE DRAWINGS

Further exemplary embodiments of the invention are described below with respect to the accompanying drawings, wherein.

DETAILED DESCRIPTION

Figure 1:
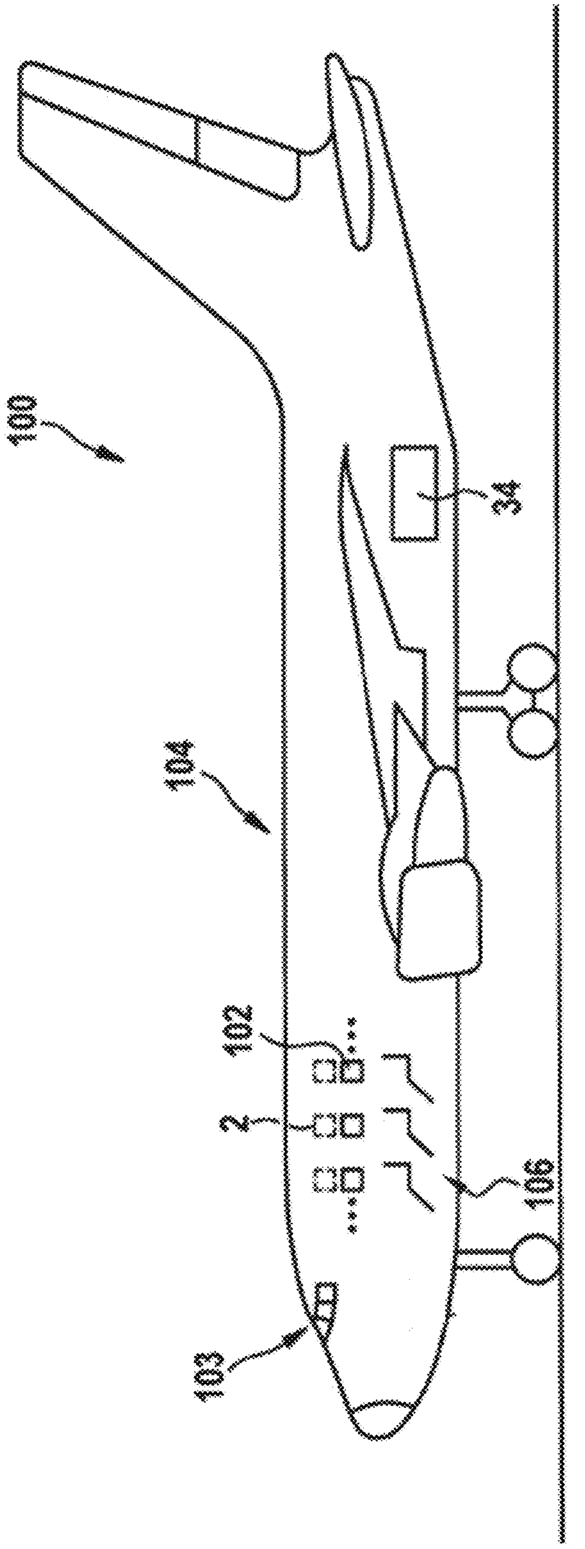
FIG. 1 shows a schematic side view of an aircraft, in particular an air plane, in accordance with an exemplary embodiment of the invention.

FIG. 1 shows an aircraft 100, in particular an air plane, in accordance with an exemplary embodiment of the invention in a schematic side view. In the exemplary embodiment shown in FIG. 1, the aircraft 100 is a large passenger air plane, comprising a cockpit 103 and a passenger cabin 104, housing a plurality of passenger seats 106. In general, the aircraft 100 may be a commercial passenger air plane, a private air plane, a military aircraft, or a rotorcraft, such as a helicopter.

In an exemplary configuration, in which the aircraft 100 comprises six passenger seats 106 in every row, each row of passenger seats 106 may have two aircraft emergency oxygen supply systems 2 in accordance with exemplary embodiments of the invention associated therewith, one aircraft emergency oxygen supply system 2 assigned to the passenger seats 106 on the left side of a center aisle and one aircraft emergency oxygen supply system 2 assigned to the passenger seats 106 on the right side of the center aisle.

For the exemplary embodiment of each row of passenger seats 106 having six seats, every aircraft emergency oxygen supply system 2 may include one oxygen supply/oxygen generator and three oxygen masks, coupled to the oxygen supply/oxygen generator. Such a set-up is schematically illustrated in FIG. 1 via three exemplary passenger windows 102, each being associated with a row of passenger seats 106, and via three exemplary aircraft emergency oxygen supply systems 2, depicted in phantom due to their arrangement within the aircraft 100.

Figure 2:
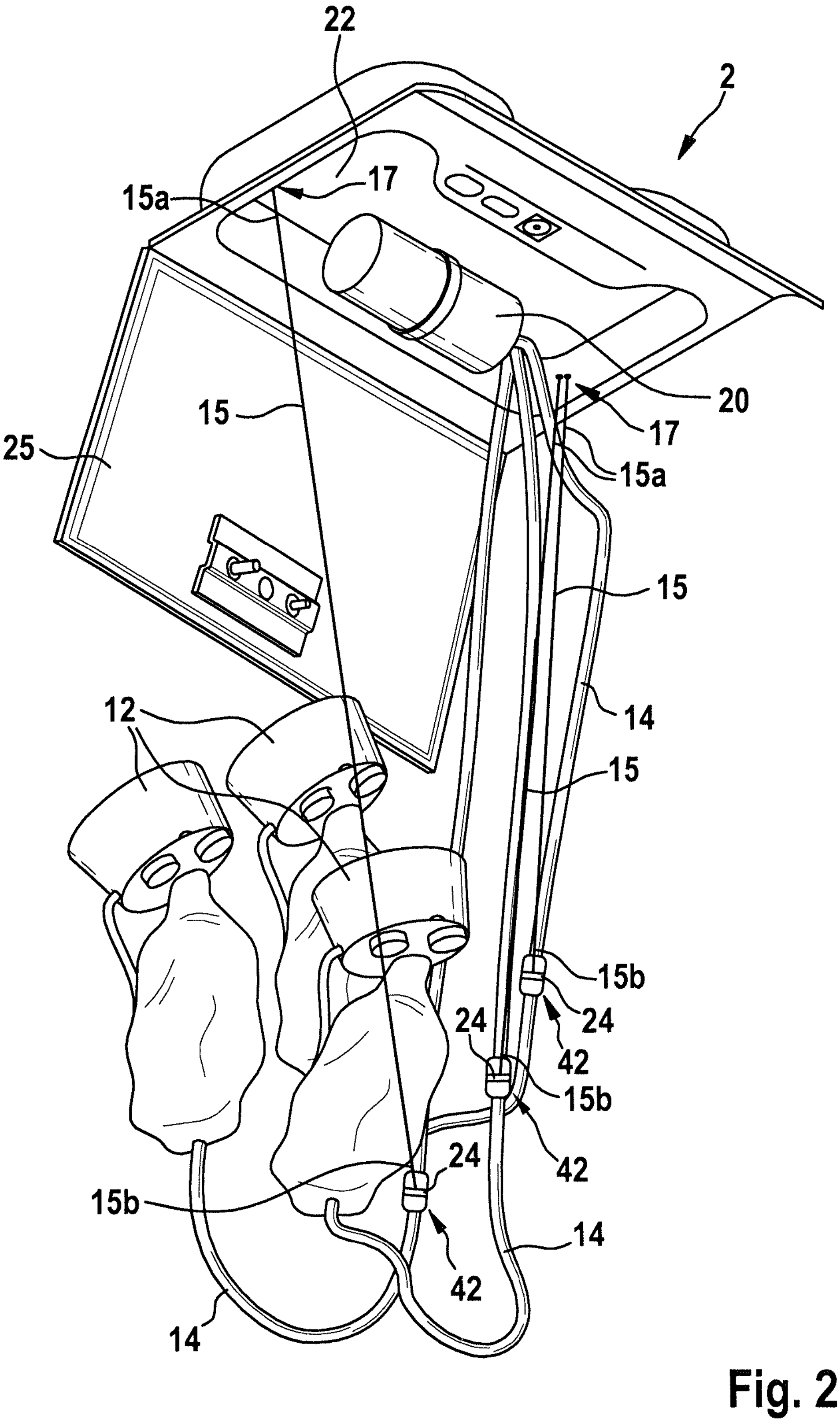
FIG. 2 shows a perspective view of an aircraft emergency oxygen supply system in accordance with an exemplary embodiment of the invention, with the oxygen masks of the aircraft passenger oxygen supply module being shown in a deployed state.

FIG. 2 depicts an aircraft emergency oxygen supply system 2 in accordance with an exemplary embodiment of the invention, as it may be installed in the passenger cabin 104 of an aircraft 100. The aircraft emergency oxygen supply system 2 depicted in FIG. 2 comprises an oxygen generator 20 and three oxygen masks 12. The oxygen generator 20 may be a device that generates oxygen in a chemical reaction. It is also possible that the oxygen generator is a local oxygen supply that releases oxygen over time, e.g. a local oxygen supply in the form of an oxygen tank.

Alternative embodiments, which are not explicitly shown in the Figures, may comprise more or less than three oxygen masks 12. Instead of comprising an oxygen generator 20, the aircraft emergency oxygen supply system 2 may be coupled to an external oxygen supply, provided within the aircraft 100 separately from the aircraft emergency oxygen supply system 2.

During normal operation of the aircraft 100, when the air pressure within the passenger cabin 104 is sufficiently high, the oxygen masks 12 are stored within a compartment 22 of the aircraft emergency oxygen supply system 2, which is installed above the passenger seats 106. In such a configuration, a movable door 25 of the aircraft emergency oxygen supply system 2 is in a closed position, in which it covers the oxygen generator 20 and prevents the oxygen masks 12 from dropping out of the compartment 22.

In case of pressure loss within the passenger cabin 104, the movable door 25 opens, allowing the oxygen masks 12 to drop out of the compartment 22, so that passengers sitting on the passenger seats 106 below the aircraft emergency oxygen supply system 2 may grab the oxygen masks 12.

Each oxygen mask 12 is fluidly coupled with the oxygen generator 20 by an oxygen hose 14, which allows the oxygen generator 20 to supply oxygen rich gas via the oxygen hose 14 to the respective oxygen mask 12.

Each oxygen hose 14 comprises a clip fixing portion 42, which may in particular have the form of a shroud 42. The clip fixing portion 42 may be a portion of the oxygen hose 14 having an increased diameter.

A respective fixing clip 24, which will be discussed in more detail below, is releasable coupled with, in particular clipped to, each clip fixing portion 42.

A lanyard 15 extends between each fixing clip 24 and the compartment 22. A first end 15*a* of each lanyard 15 is attached to a lanyard fixing point 17 within or at the compartment 22, and an opposing second end 15*b* of each lanyard 15 is fixed to the respective fixing clip 24.

As a result, each oxygen mask 12 is held by one of the lanyards 15 above the passenger seats 106 (see FIG. 1), after the movable door 25 has been opened and the oxygen masks 12 have dropped out of the compartment 22. The oxygen masks 12 may in particular be held in positions in front of the passengers in the passenger's field of view and reach. This allows passengers, sitting on the passenger seats 106, to easily see and grab one of the oxygen masks 12, which are positioned in front of them.

All lanyards 15 of the aircraft emergency oxygen supply system 2 may be attached to a common lanyard fixing point 17 in or at the compartment 22. Alternatively, a plurality of lanyard fixing points 17 may be provided in or at the compartment 22. This may allow for fixing different lanyards 15 to different lanyard fixing points 17, in particular to different lanyard fixing points 17 which are spatially separated from each other.

Attaching different lanyards 15 to different lanyard fixing points 17 may allow for distributing the positions of the oxygen masks 12, hanging from the aircraft emergency oxygen supply system 2, in a beneficial spatial configuration above the passenger seats 106. In particular, such an arrangement may allow for spatially distributing the positions of the oxygen masks 12 over a plurality of passenger seats 106, which are installed below the emergency oxygen supply systems 2.

The oxygen generator 20 may include an activation mechanism/trigger mechanism, which starts to supply oxygen rich gas to an oxygen mask 12. In particular, the oxygen generator 20 may be an oxygen generator that is electrically triggered and/or electrically controlled during use of the oxygen masks 12. Further in particular, the oxygen generator 20 may be an oxygen generator that is triggered via the detection of a passenger breath by a suitable sensor and that controls the supply of oxygen during use of the oxygen mask via the continuous detection of passenger breaths. In such an arrangement, the lanyard does not form the mechanical trigger for the oxygen generator, and the oxygen masks are ready to be used, irrespective of whether and how strongly they are pulled towards the passengers' faces.

Each fixing clip 24, which is releasably attached to a clip fixing portion 42 of an oxygen hose 14, is configured such that it releases the clip fixing portion 42 of the oxygen hose 14, when a passenger grabs an oxygen mask 12 and pulls the oxygen mask 12 towards his/her face. After the clip fixing portion 42 has been released from the fixing clip 24, the passenger is able to move the oxygen mask 12 freely into a desired position, in particular in a position in which the oxygen mask 12 is properly positioned on the passenger's face, without being restricted by the lanyard 15.

In the following, the structure of the fixing clips 24 will be discussed in more detail with reference to FIGS. 3 to 6.

Four exemplary fixing clips 24, which may be part of aircraft emergency oxygen supply systems according to exemplary embodiments of the invention, are depicted in FIGS. 3 to 6.

The fixing clips 24 depicted in FIGS. 3 to 6 all have a basically planar or flat structure, i.e. a structure in which the fixing clip 24 basically extends in a plane, which is oriented orthogonal to the direction of view in FIGS. 3 to 6.

Each fixing clips 24 may have a thickness, i.e. an extension perpendicular to the main plane of extension, between 1 mm and 4 mm, in particular between 1.2 mm and 2.5 mm.

Within the main plane of extension, the fixing clip 24 may have an extension x between 8 mm and 20 mm, in particular an extension x between 10 mm and 18 mm in a first direction, and the fixing clip 24 may have an extension y between 8 mm and 30 mm, in particular an extension y between 12 mm and 22 mm in a second direction, which is perpendicular to the first direction.

The fixing clips 24 may be made of a plastic material, the fixing clips 24 may in particular be made of polyamide, such as polyamide 66.

Figure 3:
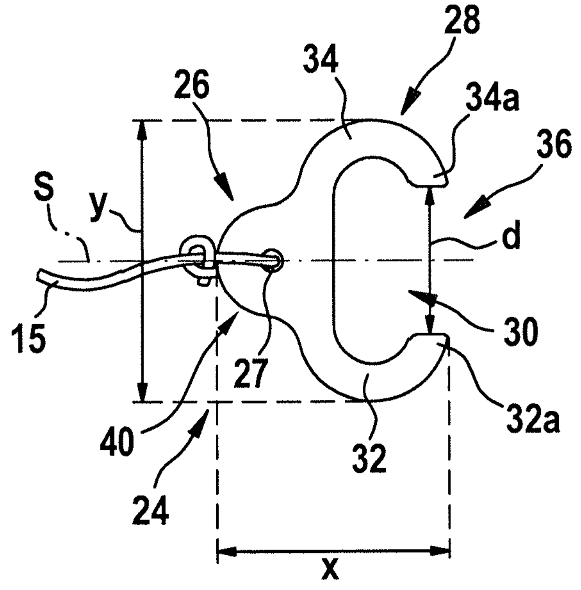
FIG. 3 depicts a plan view of a first exemplary fixing clip, as may be part of an aircraft emergency oxygen supply system in accordance with exemplary embodiments of the invention.

The fixing clip 24, which is depicted in FIG. 3, comprises a lanyard fixing portion 26, which allows for fixing the second end 15*b* of a lanyard 15 to the fixing clip 24. In the embodiment depicted in FIG. 3, the lanyard fixing portion 26 comprises a lanyard fixing opening 27, extending through the fixing clip 24. The second end 15*b* of the lanyard 15 is passed through said lanyard fixing opening 27, and the lanyard 15 is fastened to the fixing clip 24 with a knot. Other types of lanyard fixing portions 26, such as clamps, which are configured for fixing the second end 15*b* of the lanyard 15 by other suitable means, such as clamping, may be employed as well.

The fixing clip 24 further comprises a C-shaped oxygen hose fixing portion 28. The oxygen hose fixing portion 28 is configured for releasably accommodating and holding at least one oxygen hose 14 (not shown in FIG. 3). In particular, the oxygen hose fixing portion 28 may be configured for releasably accommodating and holding at least one oxygen hose 14 at an oxygen hose portion 42 with the regular oxygen hose diameter or may be configured for releasably accommodating and holding at least one oxygen hose 14 at a specifically designed clip fixing portion 42, such as at a shroud 42, which is formed on the respective oxygen hose 14.

In the embodiment of the fixing clip 24 depicted in FIG. 3, the C-shaped oxygen hose fixing portion 28 is configured for simultaneously accommodating and holding two oxygen hoses 14.

In the embodiment depicted in FIG. 3, the C-shaped oxygen hose fixing portion 28 has two legs 32, 34, which define a C-shaped outer periphery of an opening 30. The two legs 32, 34 have a curved shape. In an alternative embodiment, which is not explicitly shown in the figures, the two legs 32, 34 may have a polygonal shape, i.e. each of the two legs 32, 34 may comprise a plurality of straight or curved leg portions, which are connected with each other in a configuration, in which two adjacent leg portions are inclined with respect to each other. The term C-shaped oxygen hose fixing portion encompasses geometries with inner contours that are fully curved or partly curved or contain curved and straight sections or are assembled from various straight sections. The term C-shaped oxygen hose fixing portion is intended to encompass all geometries that substantially resemble a C.

Each of the two legs 32, 34 has a free end 32*a*, 34*a*, respectively. The free ends 32*a*, 34*a* of the two legs 32, 34 are arranged opposite to each other in a distance d from each other, so that the two legs 32, 34 form a gap 36, having a width d, between the free ends 32*a*, 34*a* of the two legs 32, 34.

The distanced between the free ends 32*a*, 34*a* of the two legs 32, 34, i.e. the width d of the gap 36, is set smaller than the sum of the diameters of two oxygen hoses 14. In consequence, two oxygen hoses 14 may not pass simultaneously through the gap 36. Thus, when two oxygen hoses 14 are commonly accommodated next to each other within the opening 30 of the C-shaped oxygen hose fixing portion 28, the oxygen hoses 14 block each other from passing the gap 36, so that the oxygen hoses 14 are not able to exit from the opening 30 via the gap 36 without the application of an external force.

At least one of the legs 32, 34 and/or at least one of the oxygen hoses 14 is elastic. Thus, at least one of the legs 32, 34 and/or at least one of the oxygen hoses 14 is elastically deformable by applying a sufficiently large force.

An elastic deformation of at least one of the legs 32, 34 and/or an elastic deformation of at least one of the oxygen hoses 14 may allow for the oxygen hoses 14 to exit from the opening 30 by passing through the gap 36.

The elastic properties of the legs 32, 34 and/or the elastic properties of the oxygen hoses 14 are set so that the forces that act onto the legs 32, 34, when the oxygen masks 12 dangle from the aircraft emergency oxygen supply systems 2, as it is depicted in FIG. 2, are not sufficient for deforming at least one of the legs 32, 34 and/or at least one of the oxygen hoses 14 sufficiently for allowing the oxygen hoses 14 to pass through the gap 36.

Further, the elastic properties of the legs 32, 34 and/or the elastic properties of the oxygen hoses 14 are set so that at least one of the legs 32, 34 and/or at least one of the oxygen hoses 14 is sufficiently deformed for allowing the oxygen hoses 14 to pass through the gap 36, when a passenger pulls at least one of the oxygen masks 12 coupled to the oxygen hoses 14 extending through the fixing clip 24.

In consequence, the passengers may release an oxygen hose 14 easily from a fixing clip 24 by puling an oxygen mask 12, which is coupled to the oxygen hose 14. As a result, the movement of the oxygen masks 12 is not restricted by the lanyards 15, and the passengers are able to move the oxygen masks 12 freely.

In the embodiment depicted in FIG. 3, the lanyard fixing portion 26 of the fixing clip 24 is formed at a central position between the two legs 32, 34 along the second direction, which is the vertical direction in the orientation depicted in FIG. 3. As a result, the fixing clip 24 is symmetric with respect to a symmetry line S, which extends through the center of the C-shaped opening 30 along the first direction. In the orientation of the fixing clip 24, as depicted in FIG. 3, the first direction and the symmetry line S extend horizontally. In other embodiments, which are not explicitly depicted in the figures, the lanyard fixing portion 26 may be formed at another position, in particular at a position, which is not positioned on the symmetry line S of the C-shaped opening 30. This would result in a fixing clip 24, which is not fully symmetrical with respect to the symmetry line S.

The lanyard fixing portion 26 also may be positioned closer to the C-shaped opening 30 than it is depicted in FIG. 3. In yet another embodiment, the lanyard fixing opening 27 may be formed in one of the legs 32, 34.

Figure 4:
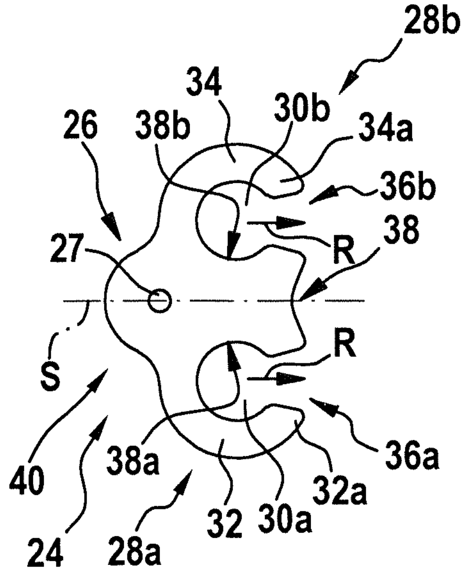
FIG. 4 depicts a plan view of a second exemplary fixing clip, as may be part of an aircraft emergency oxygen supply system in accordance with exemplary embodiments of the invention.
Figure 5:
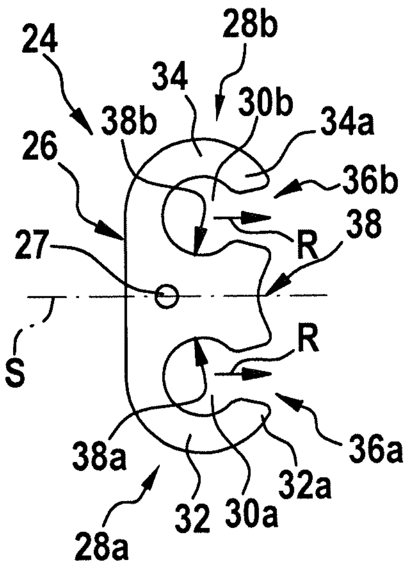
FIG. 5 depicts a plan view of a third exemplary fixing clip, as may be part of an aircraft emergency oxygen supply system in accordance with exemplary embodiments of the invention.
Figure 6:
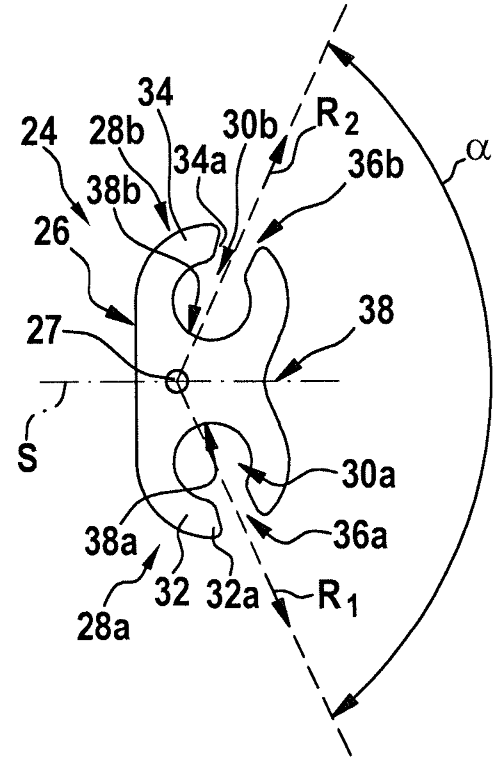
FIG. 6 depicts a plan view of a fourth exemplary fixing clip, as may be part of an aircraft emergency oxygen supply system in accordance with exemplary embodiments of the invention.

FIGS. 4 to 6 depict fixings clips 24, which may also be part of aircraft emergency oxygen supply systems in accordance with exemplary embodiments of the invention.

Each of the fixing clips 24 depicted in FIGS. 4 to 6 comprises two C-shaped oxygen hose fixing portions 28*a*, 28*b*. Each oxygen hose fixing portion 28*a*, 28*b* comprises a C-shaped opening 30*a*, 30*b*, wherein each C-shaped opening 30*a*, 30*b* is configured for accommodating and fixing a single oxygen hose 14, in particular a clip fixing portion 42 of a single oxygen hose 14, respectively.

Each of the fixing clips 24 depicted in FIGS. 4 to 6 comprises two outer legs 32, 34, wherein each of the outer legs 32, 34 is associated with one of the openings 30*a*, 30*b* defining a section of the periphery of said opening 30*a*, 30*b*. Each of the fixing clips 24 further comprises a central portion 38, which is formed between the two openings 30*a*, 30*b*. The two lateral outer edges 38*a*, 38*b* of the central portion 38 form respective sections of the outer periphery of the two openings 30*a*, 30*b*.

In the embodiment depicted in FIGS. 4 to 6, the two legs 32, 34 have a curved shape. In an alternative embodiment, which is not explicitly shown in the figures, the two legs 32, 34 may have a polygonal shape, i.e. each of the two legs 32, 34 may comprise a plurality of straight or curved leg portions, which are connected with each other in a configuration, in which two adjacent leg portions are inclined with respect to each other, so that the two legs 32, 34 define a basically C-shaped outer periphery of the opening 30.

In the embodiments depicted in FIGS. 4 and 5, the two gaps 36*a*, 36*b*, which are formed between the central portion 38 and the two legs 32, 34, are facing in the same direction, i.e. the gaps 36*a*, 36*b* are oriented parallel to each other in a direction R, which faces away from the lanyard fixing portion 26 of the fixing clip 24.

In the embodiment depicted in FIG. 4, the fixing clip 24 further comprises a protrusion 40, which extends from the fixing clip 24 on the side opposite to the gaps 36*a*, 36*b*. The lanyard fixing opening 27, which provides the lanyard fixing portion 26, is formed within said protrusion 40 or in a transition portion between the protrusion 40 and the central portion 38.

In the embodiment depicted in FIG. 5, the fixing clip 24 does not comprise a protrusion 40. In the embodiment depicted in FIG. 5, the lanyard fixing opening 27, providing the lanyard fixing portion 26, is formed within the central portion 38 between the two openings 30*a*, 30*b*.

The fixing clips 24 depicted in FIGS. 4 and 5 are symmetrical with respect to a symmetry line S extending in the first direction along the central portion 38, and the lanyard fixing opening 27 is formed on said symmetry lines S.

In alternative embodiments, which are not explicitly shown in the figures, the lanyard fixing opening 27 may be formed offset from the symmetry line S. This would result in an asymmetric configuration of the fixing clip 24. In yet another embodiment, a respective lanyard fixing opening 27 may be formed on each side of the symmetry line S. The two lanyard fixing openings 27 may in particular be formed in a configuration, which is symmetric with respect to the symmetry line S.

FIG. 6 depicts an embodiment of a fixing clip 24 with two oxygen hose fixing portions 28*a*, 28*b*, wherein each oxygen hose fixing portion 28*a*, 28*b* has a respective opening 30*a*, 30*b*, which is configured for receiving a portion of an oxygen hose 14, respectively.

The structure of the fixing clip 24 depicted in FIG. 6 is very similar to the structure of the fixing clip 24 depicted in FIG. 5. However, contrary to the fixing clips 24 depicted in FIGS. 4 and 5, in the fixing clip 24 depicted in FIG. 6, the gaps 36*a*, 36*b* between the opposing ends 32*a*, 34*a* of the legs 32, 34 and the central portion 38 are not oriented parallel to each other. Instead, when projected onto the main plane of extension of the fixing clip 24, the gaps 36*a*, 36*b* are oriented at an angle $\alpha$ between 0° and 180° ($0° < \alpha < 180°$) with respect to each other. The angle $\alpha$ may be measured between the two lines connecting a respective center of a gap 36*a*, 36*b* and a respective center of an opening 30*a*, 30*b*. In FIG. 6, these two lines are indicated as dashed lines. In the depicted exemplary embodiment, the dashed lines also run through the lanyard fixing opening 27. However, they may also be offset from the lanyard fixing opening 27.

The angle $\alpha$ between the orientations of the gaps 36*a*, 36*b* may in particular be between 40° and 180°, further in particular between 80° and 160°, yet further in particular between 120° and 150°.

As a result, two oxygen hoses 14, which extend through the two openings 30*a*, 30*b*, may be pulled in different direction R1, R2, in order to pass through the gaps 36*a*, 36*b* for leaving the openings 30*a*, 30*b*. In consequence, two oxygen hoses 14, which extend through the two openings 30*a*, 30*b*, may be separated from the fixing clip 24 by pulling the two oxygen hoses 14 apart from each other to the left and right sides of the fixing clip 24. With the passengers being laterally offset from each other in different seats, the angled orientations of the gaps 36*a*, 36*b* may provide for a particularly convenient set-up for pulling the oxygen masks towards the passengers.

Figure 7:
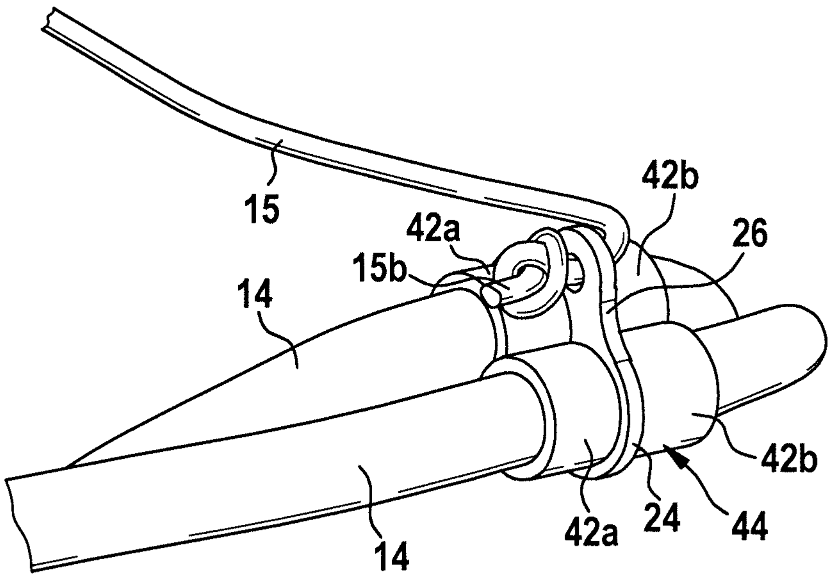
FIG. 7 depicts a perspective view of the first exemplary fixing clip, which is releasably attached to two oxygen hoses.

FIG. 7 shows a perspective view of a fixing clip 24, as it is depicted in FIG. 3, which is fixed to two oxygen hoses 14. The two oxygen hoses 14 extend parallel to each other through the fixing clip 24. The two oxygen hoses 14 extend in particular through the opening 30 of the oxygen hose fixing portion 28 of the fixing clip 24.

As in the configuration depicted in FIG. 3, the second end 15*b* of the lanyard 15 extends through the lanyard fixing opening 27 of the lanyard fixing portion 26, and is fixed to the fixing clip 24 by means of a knot.

FIG. 7 further shows that a clip fixing portion 42, which has the shape of a shroud 42, is formed on each oxygen hose 14, respectively, and that the shrouds 42, which are formed on the two oxygen hoses 14, cooperate with the oxygen hose fixing portion 28 of the fixing clip 24.

In the embodiment depicted in FIG. 7, each shroud 42 has two shroud portions 42*a*, 42*b* having a diameter, which is larger than the diameter of the other portions of the oxygen hose 14, i.e. a diameter, which is larger than the diameter of those portions of the oxygen hose 14, on which no shrouds 42 are formed.

The two shroud portions 42*a*, 42*b* of the shroud 42 are formed proximate each other along a longitudinal direction of the oxygen hose 14. A slot 44, which extends orthogonally to the longitudinal direction of the oxygen hose 14, is formed between the two shroud portions 42*a*, 42*b*. Within the slot 44, the shroud 42 has a smaller diameter than the two adjacent shroud portions 42*a*, 42*b*. At the slot, the shroud 42 may have a diameter that is similar to the diameter of the oxygen hose 14 or may have a diameter that is in between the diameter of the oxygen hose and the diameter of the two shroud portions 42*a*, 42*b*.

When the fixing clip 24 is releasably attached to a shroud 42 of an oxygen hose 14, the fixing clip 24 is inserted into the slots 44, so that the oxygen hose fixing portion 28 of the fixing clip 24 is sandwiched between the two shroud portions 42*a*, 42*b*.

When the oxygen hose fixing portion of the fixing clip 24 is inserted into the slot 44, formed between adjacent shroud portions 42*a*, 42*b*, the fixing clip 24 is not able to slide along the longitudinal direction of the oxygen hoses 14. As a result, the position of the fixing clip 24 along the longitudinal direction of the oxygen hoses 14 is well defined and fixed.

The shroud portions 42*a*, 42*b* may be formed integrally with the respective oxygen hose 14. Alternatively, the shroud portions 42*a*, 42*b* may be attached to the respective oxygen hose 14. The shroud portions 42*a*, 42*b* may, for example, be glued to the oxygen hose 14.

A plurality of clip fixing portions/shrouds 42 may be formed at different positions along the longitudinal direction of each oxygen hose 14. Providing a plurality of clip fixing portions/shrouds 42 may allow for selectively fixing the lanyard 15 to one of a plurality positions of the oxygen hose 14 by attaching the fixing clip 24 to different clip fixing portions 42, which are provided at different positions along the oxygen hose 14. The particular clip fixing portion 42, to which a fixing clip 24 is releasably attached, may for example be selected depending on the positions of the passengers seats 106 with respect to the aircraft emergency oxygen supply system 2, in order to adapt the positions of the oxygen masks 12, when dangling from the aircraft emergency oxygen supply systems 2, to the respective passenger seat configuration.

Figure 8:
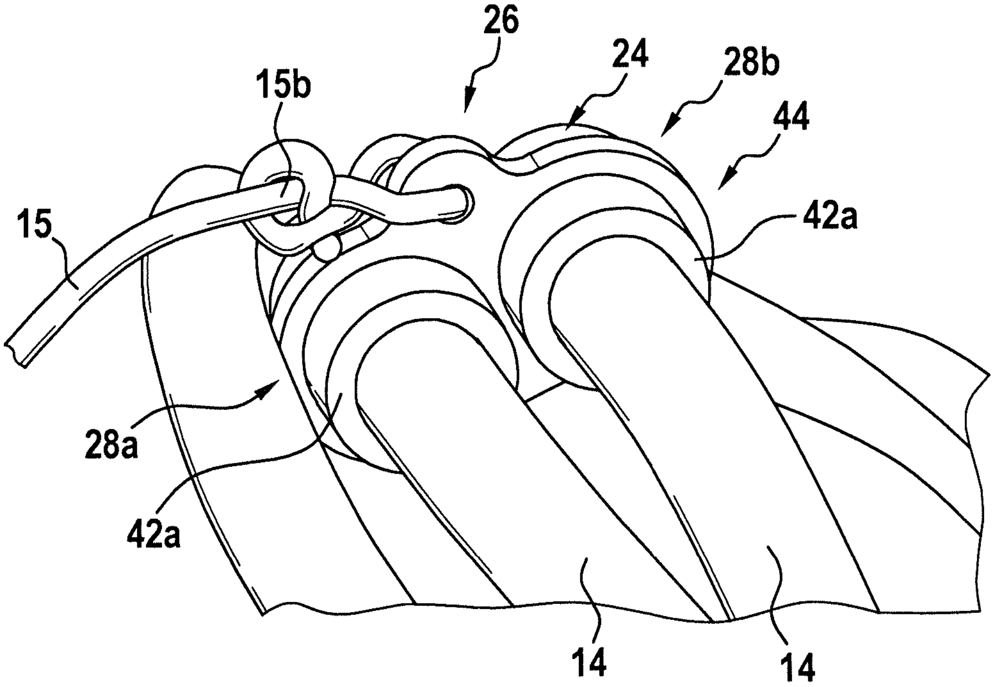
FIG. 8 depicts a perspective view of the second exemplary fixing clip, which is releasably attached to two oxygen hoses.

FIG. 8 shows a perspective view of a fixing clip 24, as it is depicted in FIG. 4, wherein two oxygen hoses 14 are received within the two openings 30*a*, 30*b* of the two oxygen hose fixing portions 28*a*, 28*b* of the fixing clip 24.

A second end 15*b* of a lanyard 15 extends through the lanyard fixing opening 27 of the lanyard fixing portion 26, and the lanyard 15 is fixed to the fixing clip 24 by a knot.

The shrouds 42, which are formed on the oxygen hoses 14 and cooperate with the oxygen hose fixing portions 28*a*, 28*b* of the fixing clip 24, are identical with the shrouds 42, depicted in FIG. 7. Therefore, they are not discussed in detail again. Each of the oxygen hose fixing portions 28*a*, 28*b* cooperates with an associated slot 44 between respective shroud portions 42*a*, 42*b*.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

The invention claimed is:

1. Aircraft emergency oxygen supply system comprising:

at least one passenger oxygen mask;

a compartment for housing the at least one passenger oxygen mask;

at least one oxygen hose, wherein each of the at least one passenger oxygen mask is coupled to a respective oxygen hose for supplying a gas comprising oxygen to the respective oxygen mask; and at least one fixing clip, wherein each of the at least one fixing clip comprises:

a lanyard fixing portion; and at least one C-shaped oxygen hose fixing portion for releasably holding one or more oxygen hoses;

for each of the at least one fixing clip, a lanyard having a first end, which is fixed at the compartment, and an opposing second end, which is fixed to the lanyard fixing portion of the respective fixing clip;

wherein at least one of the oxygen hoses includes at least one shroud for positioning the fixing clip along the oxygen hose.

2. An aircraft emergency oxygen supply system according to claim 1, wherein the at least one C-shaped oxygen hose fixing portion is elastic, allowing the one or more oxygen hoses to escape from the at least one C-shaped oxygen hose fixing portion, when being pulled.

3. An aircraft emergency oxygen supply system according claim 1, wherein at least one of the fixing clips comprises one C-shaped oxygen hose fixing portion for releasably holding two oxygen hoses side-by-side.

4. An aircraft emergency oxygen supply system according to claim 3, wherein the lanyard fixing portion of the fixing clip is arranged at a center portion of the fixing clip, in particular at a center portion of the one C-shaped oxygen hose fixing portion.

5. An aircraft emergency oxygen supply system according claim 1, wherein at least one of the fixing clips comprises two C-shaped oxygen hose fixing portions for releasably holding one oxygen hose each.

6. An aircraft emergency oxygen supply system according to claim 5, wherein the lanyard fixing portion of the fixing clip is arranged between the two C-shaped oxygen hose fixing portions.

7. An aircraft emergency oxygen supply system according to claim 5, wherein the two C-shaped oxygen hose fixing portions are arranged adjacent to each other and have a common orientation.

8. An aircraft emergency oxygen supply system according to claim 5, wherein the two C-shaped oxygen hose fixing portions are arranged adjacent to each other and are angled with respect to each other, with an angle $\alpha$ between the two C-shaped oxygen hose fixing portions of between 40° and 180°.

9. An aircraft emergency oxygen supply system according claim 8, wherein $\alpha$ is between 80° and 160°.

10. An aircraft emergency oxygen supply system according claim 9, wherein $\alpha$ is between 120° and 150°.

11. An aircraft emergency oxygen supply system according to claim 1, wherein the at least one shroud portion includes two shroud portions for positioning the fixing clip therebetween.

12. An aircraft emergency oxygen supply system according to claim 11, wherein the shroud is formed integrally with the respective oxygen hose, or wherein the shroud is attached to the respective oxygen hose.

13. An aircraft emergency oxygen supply system according to claim 1, wherein the at least one fixing clip is made of a plastic material.

14. An aircraft emergency oxygen supply system according to claim 1, wherein the lanyard fixing portion comprises a lanyard fixing opening, wherein the second end of the lanyard is in particular tied to the lanyard fixing opening.

15. An aircraft emergency oxygen supply system according to claim 1, comprising at least two fixing clips and at least two lanyards, wherein the first ends of the at least two lanyards are in particular fixed to spatially separated fixing points of the compartment.

16. An aircraft emergency oxygen supply system according to claim 1, further comprising:

an oxygen supply, coupled to the at least one oxygen hose, wherein the oxygen supply is electrically triggered and/or electrically controlled during the supply of oxygen to the at least one passenger oxygen mask in response to a breath detection.

17. An aircraft comprising:

a passenger cabin; and a plurality of aircraft emergency oxygen supply systems according to claim 1.

* * * * *